No. 729,261. PATENTED MAY 26, 1903.
J. BLACK & F. J. SMITH.
SOLDERING MACHINE.
APPLICATION FILED SEPT. 4, 1902.
NO MODEL. 2 SHEETS—SHEET 1.
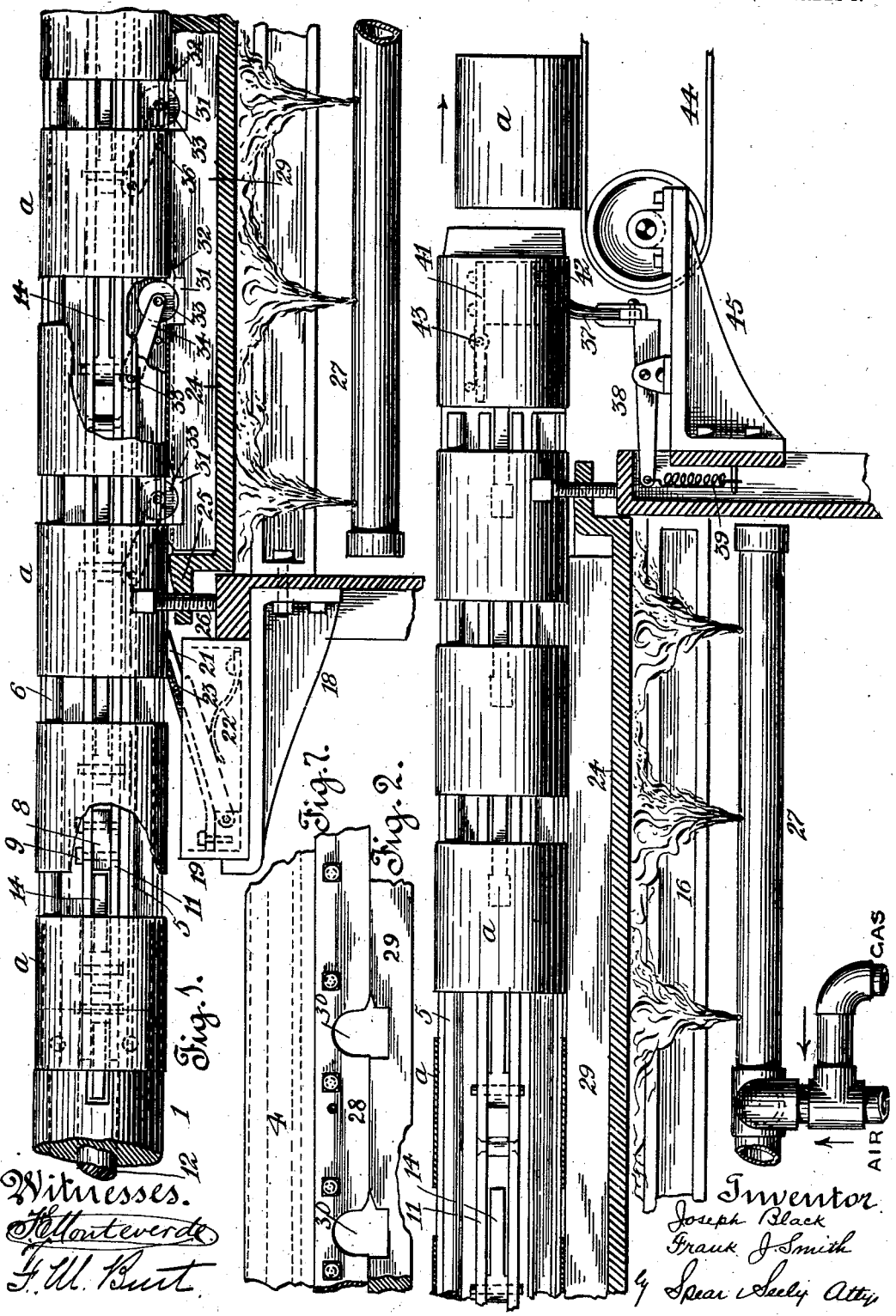
Witnesses.
H. Monteverde
F. M. Burt
Inventor:
Joseph Black
Frank J. Smith
by Spear & Seely Attys No. 729,261. PATENTED MAY 26, 1903.
J. BLACK & F. J. SMITH.
SOLDERING MACHINE.
APPLICATION FILED SEPT. 4, 1902.
NO MODEL. 2 SHEETS—SHEET 2.
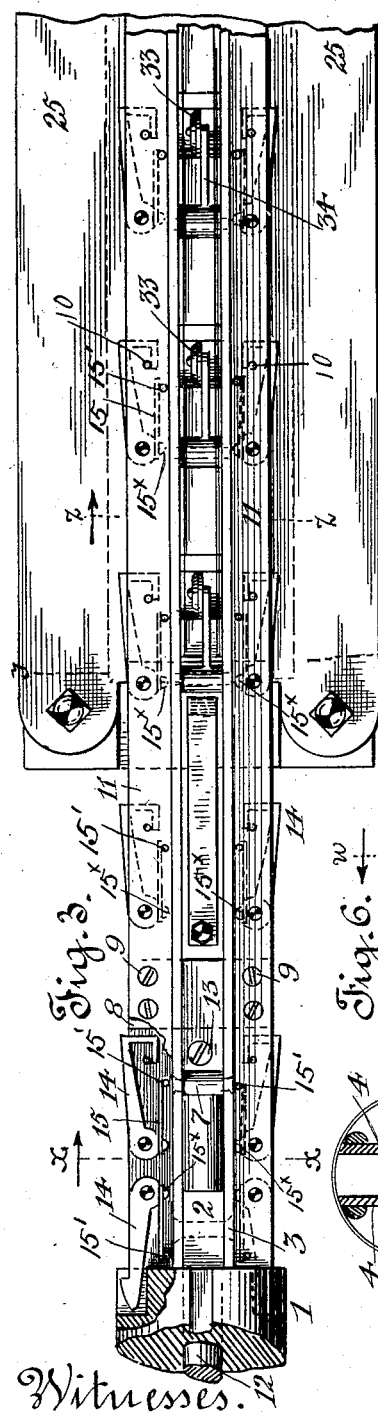
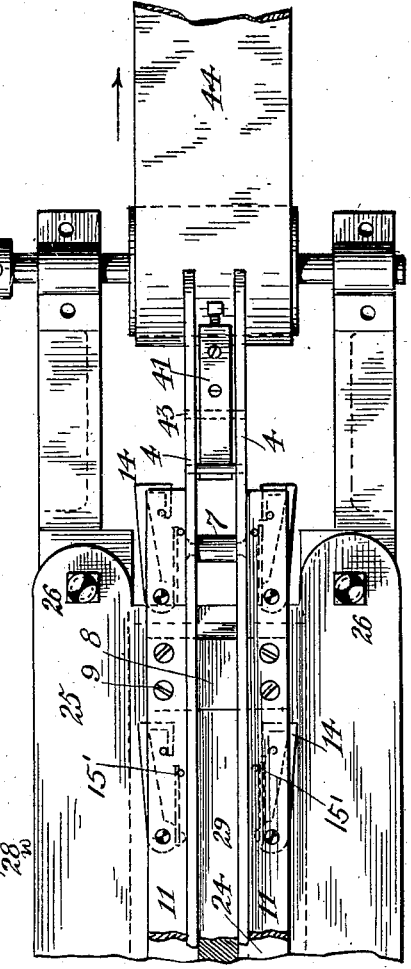
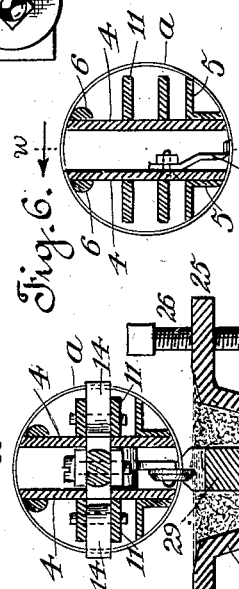
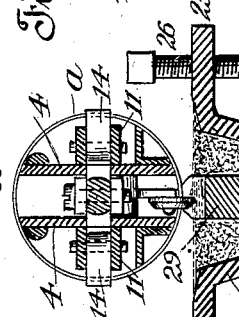
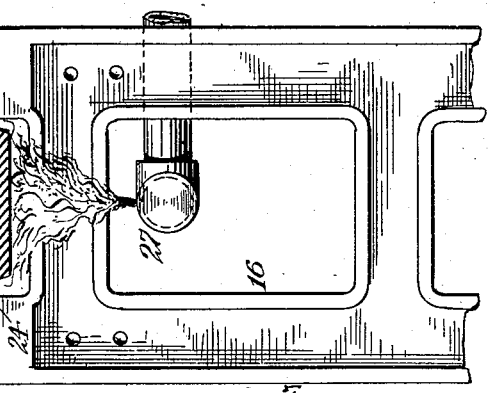
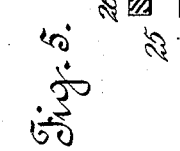
Witnesses. Inventors
Joseph Black
Frank J. Smith
by Spear Seely Attys No. 729,261. Patented May 26, 1903.

UNITED STATES PATENT OFFICE.

JOSEPH BLACK AND FRANK J. SMITH, OF SAN FRANCISCO, CALIFORNIA.

SOLDERING-MACHINE.

SPECIFICATION forming part of Letters Patent No. 729,261, dated May 26, 1903.

Application filed September 4, 1902. Serial No. 122,110. (No model.)

*To all whom it may concern:*

Be it known that we, JOSEPH BLACK and FRANK J. SMITH, citizens of the United States, residing at San Francisco, in the county of San Francisco and State of California, have invented certain new and useful Improvements in Soldering-Machines, of which the following is a specification.

The invention relates to the soldering of the side seams of sheet-metal can-bodies.

The object of our invention is to solder the side seams of such cans rapidly, thoroughly, and economically with a minimum expenditure of solder.

A machine embodying our invention contains novel means of applying solder to the inside seam operating in connection with outside means for sweating the solder thoroughly into the seam, and such a machine contains various other novel features of construction and arrangement, which are fully hereinafter described and are shown in the accompanying drawings, in which—

Figures 1 and 2 taken together form a side elevation of the machine. Figs. 3 and 4 taken together are a plan view of the same. Fig. 5 is a cross-section partly of the horn at $x\ x$ of Fig. 3 and partly of the soldering-trough at $y\ y$ of Fig. 3. Fig. 6 is a cross-section at $z\ z$ of Fig. 3. Fig. 7 is a section on $w\ w$ of Fig. 6, showing in elevation the inner face of one of the frame-bars of the horn, the seam-guide, and the soldering-bar.

The machine is supposed to form a part and continuation of a can-body-forming machine of any desired construction—such, for instance, as the body-forming portion of the machine illustrated in our application for patent, Serial No. 105,547, filed May 1, 1902. On the latter assumption, 1 in the drawings represents the part of the forming-horn, around which sheet-metal blanks are bent into can-bodies. The horn is shown with a stub end 2, to which is rigidly secured, as by rivets 3, the skeleton frame or continuation of said horn. This continuation might be formed in one piece with the horn; but for convenience we prefer to use such a skeleton framework as is shown. This is a long frame forming a guide for the can-bodies, which with their side seams closed are propelled along it and through the soldering devices. It is composed of two vertical bars 4, Fig. 6, having edges shaped to conform substantially to the arcs of the can-bodies and which are stiffened by the angle-pieces 5 and the beadings 6 and are held together by rivets 7, Figs. 3 and 4, at suitable intervals. The can-bodies $a$ fit the frame, Figs. 5 and 6, and are propelled along it. The bars 4 are slotted to provide guides for the reciprocating cross-heads 8, which extend transversely and project through such slots, outside of which they are secured at 9 to the reciprocating carrier-bars 11. The cross-heads and carriers are operated in any suitable manner from a proper driving-shaft. (Not shown.) We have shown a connecting-rod 12, secured at 13 to said cross-head and extending back through the horn to the driving mechanism of the body-machine. Between the carrier-bars on each side are pivoted the pawls or carriers 14, thrown outwardly by springs 15, so as to bear against the rear of the can-body and push it along the length of the carrier-stroke. These springs are preferably leaf-springs, which are fixed to a flat surface of the carrier by pins $15^\times$, adjacent to its pivot, and at their free ends these springs bear on fixed pins 15', Fig. 3, and so tend to throw the operative end of such carrier positively outward. Returning each carrier yields and is drawn back through the following can-body into effective position behind the latter. The stops 10 limit the outward movement of the pawls or carriers 14.

Beneath the horn is a supporting-frame 16, comprising vertical standards and horizontal beams. To this frame is bolted a bracket 18, which supports the acid-tank 19. The device for applying acid is an arm 21, pivoted in the tank centrally below the horn and extending at an upward incline toward the passing can-bodies, toward which it is pressed by a spring 22. The arm is surfaced with soft material 23, as shown, which absorbs acid from the tank and applies it along the side seam. The solder-tank is a trough 24, depressed below its flanges 25 and adjustably mounted upon the frame 16 by the screw-bolts 26, whereby its position relatively to the horn can be regulated. Below the trough are any suitable heating means for keeping the solder in a proper state of fusion. We have shown a gas-pipe 27 with burner-orifices which direct jets of flame against the bottom of the trough.

The can-bodies properly spaced upon the horn and moved intermittingly by the carriers are held in line with the side seam lowermost by the long seam-guide 28 within the horn, Fig. 6, and are moved over the solder-trough and the soldering devices, which are so constructed and arranged as to apply solder to the inside of the seam, to heat the outside of the seam, and to thoroughly sweat the solder throughout the seam both from inside and outside. The solder-applying devices comprise two coöperating mechanisms. There is a long solid soldering iron or bar 29 set longitudinally and centrally in the trough and extending from end to end, Figs. 1 and 2, and having a substantially flat surface. In its upper surface is a series of recesses 31, (three of which are shown,) spaced according to the lengths of the can-bodies and each having a beveled edge 32, facing the oncoming bodies. This bar performs a double function—that is, besides acting as a soldering or sweating iron it is also the main support for the horn, which it underlies for the greater part of its length and whose rigidly-secured seam-guide 28 is directly supported by it. The end of the horn can thus be free and supporting-rollers dispensed with. The beveled edges to the recesses enable the can-bodies to enter between. The upper surface of the bar is always above the solder-level; but its recesses extend below the solder, which in ordinary practice fills the trough. Hence there is solder in the recesses. With this bar coöperates a series of solder-applying devices 33, Figs. 1, 3, and 5. They are preferably, but not necessarily, rollers or arms 34, hinged upon transverse pins 35 within the horn and are so set as to drop by gravity into the respective recesses of the bar 29, normally resting against stops 36. During the interval of rest they dip into the solder, Fig. 1; but they are struck and lifted successively by the can-bodies, which pass beneath them. Hence, supposing there are three rollers, as illustrated, each can-body receives three successive applications of solder to the interior along the inside of its seam. The rollers have very narrow edges, as shown in Fig. 5, which bear against the body at the open side only of the seam, and hence no solder is wasted by being applied to the closed side of the seams. The seam-guide being heated by the soldering-bar 29 becomes in itself an inside-soldering bar. It is, moreover, provided with bevel-edged recesses 30, registering with those in the soldering-bar to allow the rollers to rise, such rollers being in the same vertical plane as the guide. Thus there are several successive applications of a small quantity of solder to the inside. As the outside of the seam is in contact with the hot soldering-bar, the solder is thoroughly sweated into the seam as the can progresses. In practice some small quantity of solder finds its way to the bar underneath the seam, and so, although the surface of the bar receives no solder directly from the tank, there is always a thin film upon it, which is applied to and sweated into the seam from the outside. This results in a very effective, thorough, and also economical side-seam soldering. Beyond the series of recesses the soldering-bar has a straight flat upper surface, along which the heating and sweating continues. It should be stated that that part of the solder-trough which contains the solder need not extend farther than is required to give solder to the rollers. In this case the remainder of the soldering-bar may receive heat directly from the flame. The seams are then wiped and the soldered bodies discharged. The outside wiper is a brush 37, mounted in a lever 38, which by a spring 39 is forced against the seam, automatically adjusting itself as the brush wears, Fig. 2. The inside wiper is a spring-pressed or gravity block 41, having a brush 42 and pivoted at 43 within the horn, Fig. 4, the brush resting on the inside of the seam, as indicated in Fig. 2. After being wiped the can-bodies are discharged from the horn upon a conveyer 44, one end roller of which is shown as mounted upon a cross-shaft in the wiper-support 45 and which is driven by a sprocket 46 from the driving system of the machine or from an external source.

We do not limit ourselves to the precise constructions and arrangements described herein and shown in the drawings, as we desire to avail ourselves of such modifications and equivalents as fall properly within the spirit of our invention.

Having thus fully described the nature of our invention, what we claim as new, and desire to secure by Letters Patent, is—

1. In a soldering-machine, a horn, a solder-tank supported below it, a soldering-bar in the tank, arms hinged in the horn and normally dipping into the tank, and means for propelling can-bodies along the horn, whereby said arms are withdrawn within said can-bodies.

2. In a side-seam-soldering machine, a horn open at the bottom and having a seam-guide secured within it, a solder-tank beneath the horn, and a bar in said tank upon which said seam-guide normally rests, substantially as described and shown.

3. In a soldering-machine, a horn open at the bottom, a soldering-tank beneath it, rollers hinged in the horn and dipping into the tank, and means for propelling can-bodies along the horn, whereby said rollers are withdrawn within the can-bodies, substantially as described and shown.

4. In a soldering-machine, a horn open at the bottom, a soldering-tank, a bar in said tank having its upper surface above the solder-level, but provided with recesses extending below said level, arms hinged in the horn and projecting into said recesses, and means for propelling can-bodies along the horn; whereby said arms are intercepted and raised from the recesses and into the can-bodies, substantially as described and shown.

5. In a soldering-machine, a horn for guiding the can-bodies, a solder-tank beneath it, rollers hinged in the horn and projecting normally into the tank, such rollers being intercepted and raised by and into the can-bodies, and being so placed relatively to the inside seam as to apply solder adjacent to its open side, substantially as described and shown.

6. In a soldering-machine, a horn, a solder-tank, a soldering-bar in said tank and extending above it, an inside solder-applying device dipping into the tank, and caused to enter can-bodies on the horn by contact with said bodies, and heating means: whereby solder is applied to the inside of the can, and is sweated into the seam by the outside contact between said seam and said soldering-bar, substantially as described and shown.

7. In a soldering-machine, the combination with the horn and with devices for applying solder within a can-body on the horn, of a seam-guide within the horn having recesses in its edge, substantially as and for the purposes set forth.

8. In a soldering-machine, the combination with the horn, of pivoted arms projecting therefrom, a solder-tank from which said arms receive solder, and a seam-guide within the horn, and in the vertical plane of said arms, and provided with recesses to permit said arms to be withdrawn within the horn, substantially as described and shown.

9. In a soldering-machine, a horn, a seam-guide within it having recesses, a solder-trough, a soldering-bar within it having registering recesses, and arms hinged within the horn, and projecting normally into the recesses of the soldering-bar, but adapted to be withdrawn into the recesses in the seam-guide, substantially as described and shown.

10. In a soldering-machine, a horn, a bar or seam-guide within the same having bevel-edged recesses, a solder-trough, a soldering-bar within the same having registering beveled-edged recesses; the two bars being normally in contact but adapted to receive the can-body side seam between them, substantially as described and shown.

11. In a soldering-machine, a horn, a solder-tank, a soldering-bar in said tank, an inside soldering-bar normally in contact with the outside bar, an inside solder-applying device normally dipping into the tank, but caused to rise and enter can-bodies on the horn by contact with said bodies, thereby applying solder to the inside of the said bodies, and heating means; whereby the solder is sweated into the seam substantially as described.

12. In a soldering-machine, a horn, a solder-tank, a soldering-bar, an inside solder-applying device dipping into the tank and caused to rise and enter can-bodies on the horn by contact with said bodies, thereby applying solder to the inside of the said bodies, and means for heating the solder and the solder-bar whereby the solder is sweated into the seam, substantially as described.

In testimony whereof we have affixed our signatures, in presence of two witnesses, this 26th day of August, 1902.

JOSEPH BLACK.
FRANK J. SMITH.

Witnesses:
HARRY L. HORN,
E. J. MABAURD.